June 24, 1958 K. SCHERER 2,839,961

ACCORDIONS

Filed April 14, 1954 8 Sheets-Sheet 1

INVENTOR
KARL SCHERER
By: Young, Emery & Thompson
Attys.

INVENTOR
KARL SCHERER
By: Young, Emery & Thompson
Attys.

ACCORDIONS

Filed April 14, 1954 8 Sheets-Sheet 3

INVENTOR
KARL SCHERER
By: Young, Emery & Thompson
Attys.

INVENTOR
KARL SCHERER
By: Young, Emery & Thompson
Attys.

INVENTOR
KARL SCHERER
By: Young, Emery & Thompson
Attys

June 24, 1958 K. SCHERER 2,839,961

ACCORDIONS

Filed April 14, 1954 8 Sheets-Sheet 6

INVENTOR

KARL SCHERER

By: Young, Emery & Thompson

Attys.

June 24, 1958 K. SCHERER 2,839,961

ACCORDIONS

Filed April 14, 1954 8 Sheets-Sheet 7

INVENTOR
KARL SCHERER
By: Young, Emery & Thompson
Att'ys.

ACCORDIONS

INVENTOR
KARL SCHERER
By: Young, Emery & Thompson
Attys.

2,839,961

ACCORDIONS

Karl Scherer, Trossingen, Wurttemberg, Germany

Application April 14, 1954, Serial No. 423,169
7 Claims. (Cl. 84—376)

Figure 1:
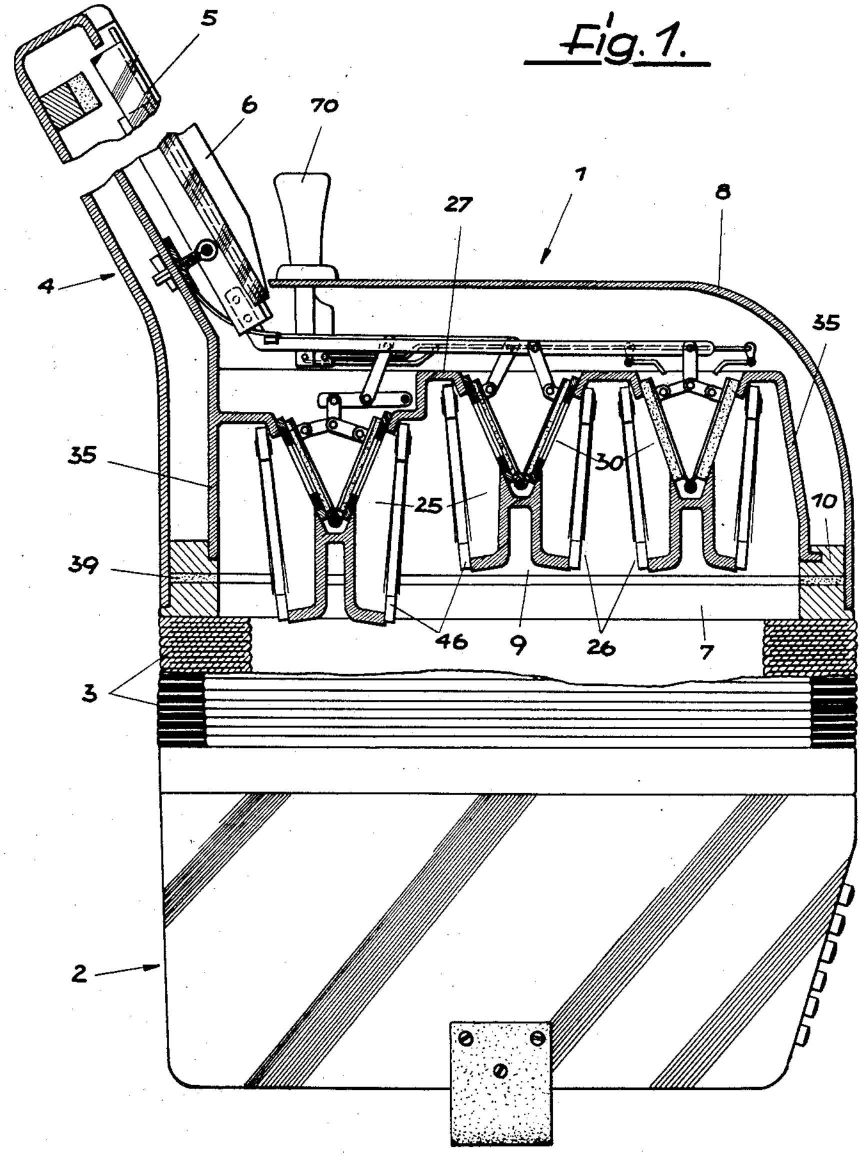

This invention relates to accordions or the like comprising a structure including a cellular unit in which the reed plates are mounted.

The primary object of the invention is to provide such a cellular unit to be produced by conventional molding methods from plastic material.

For this purpose the cellular unit, according to the present invention is closed by walls extending towards the plane of the bellows and consists of a multiplicity of interconnected cells open towards the bellows side and carrying the reed plates at each opening. All parts of the cellular unit are so formed that their surfaces can make contact with two co-operating die members, which may comprise a movable and a fixed die member in the production of the unit.

The cellular unit may have a broken line profile and the cells may each have its opening in the broken line surface of the unit, which surface lies at an angle to a reference plane of the cellular unit which is most remote from the plane of the bellows. Also the edges of the cell openings adjacent and parallel to this plane of reference, and the cell edges carrying the reed plates opposite to and extending parallel to said reference plane, are arranged in parallel planes. All parts of the cellular unit are so formed that their surfaces will make contact with two co-operating die members during manufacture and of which the closing or operational movement is parallel to said parallel planes.

This cellular unit can be used for both the treble and the base part of an accordion. The unit can also form parts for fabricated groups of cell rows to be attached to each other at adjacent edges by forming said edges with interlocking grooves and tongues.

Adjacent cells preferably have at least one common partition. In such case adjoining cells may have common walls carrying reed plates as well as walls without reed plates, thereby saving material.

The cell rows of the cellular unit extend preferably parallel to each other which makes it possible to use a shaping die and permits pre-fabrication of similarly arranged control means for operating the air flaps which cover the air openings of the cells in the unit.

The unit is preferably made integral with a plate serving as a keyboard support and which extends from the unit at an angle to the reference plane and has openings for attaching the keys. In this way the keys and their air flap carrying levers have an exact position with reference to the cellular unit, and co-operating die members during manufacture can be arranged to punch the necessary openings in the keyboard plate incidental to the formation of the cellular unit.

This construction of the cellular unit enables the plate which can be subdivided according to the groups of cell rows, to provide a particularly favorable mounting for the keys and for their easy replacement on the plate. The key mounting can also comprise a number of mounting elements corresponding to the number of the groups of cell rows. The mounting and attachment means comprise a bearing for each key which is releasably fixed in the plate.

The formation of the cellular unit with the surface with the cell openings extending at an angle to the reference plane, provides a very convenient control of the air flaps covering said openings. Since the air flaps also lie at an angle to the plane of reference, they can readily be adapted for attachment to their key actuated control elements.

Furthermore the invention also provides a particularly advantageous attachment of the reed plates to their cell openings in the cellular unit which prevents undesirable vibrations of the reed plates and transmission of such vibrations to the cell structure, and also allows exchange of reed plates owing to their easy releasable attachment, thereby overcoming the difficulty of inaccessibility of these cell openings.

Figure 2:
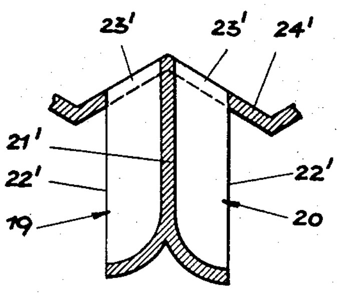
Figure 3:
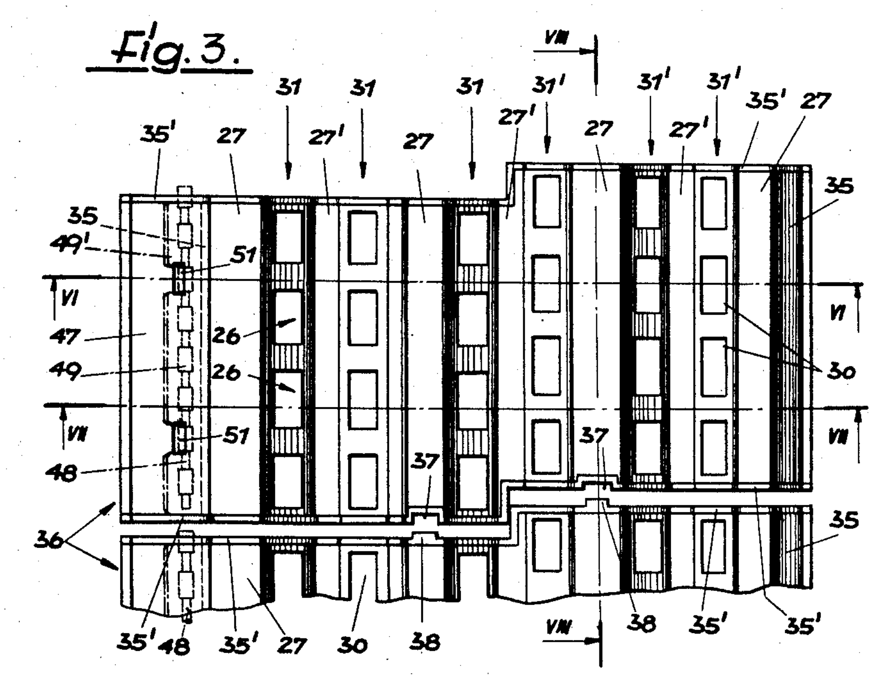
Figures 4, 5, 6:
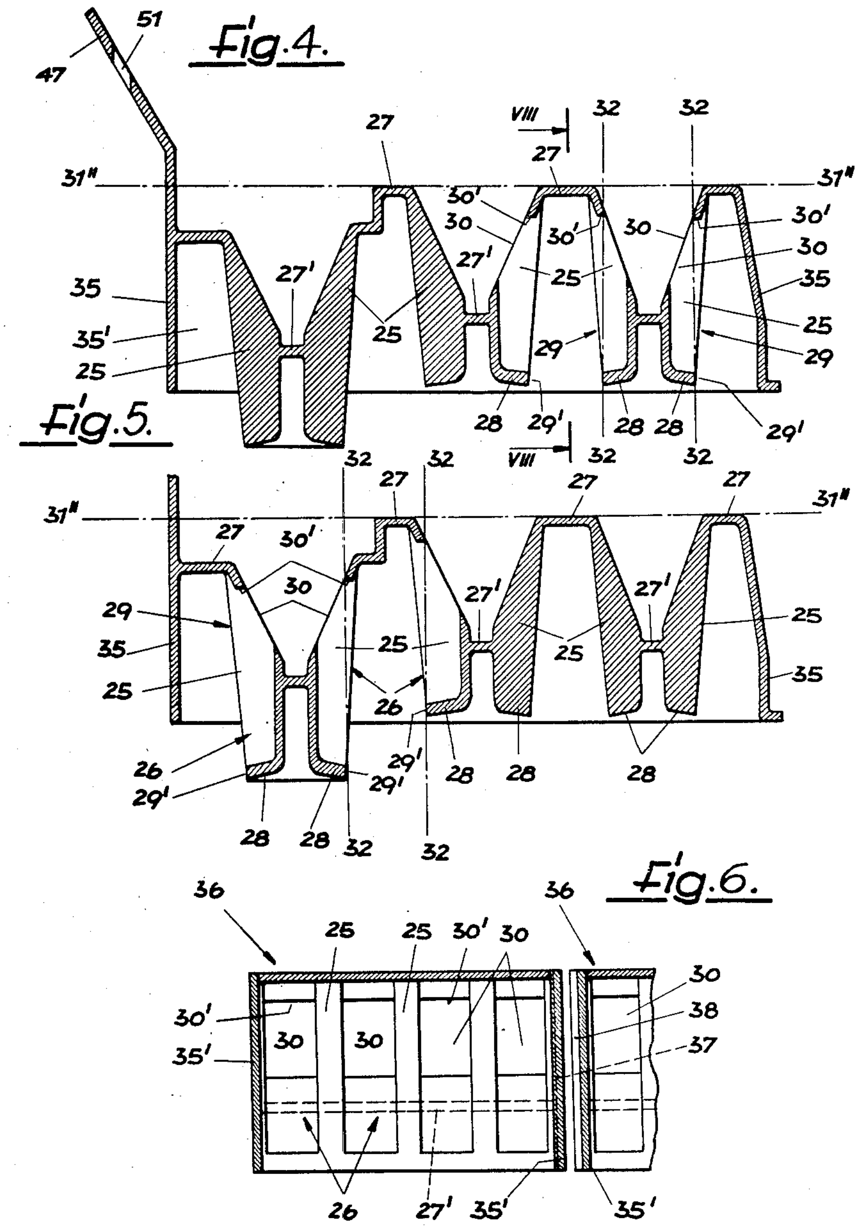
Figures 7, 25:
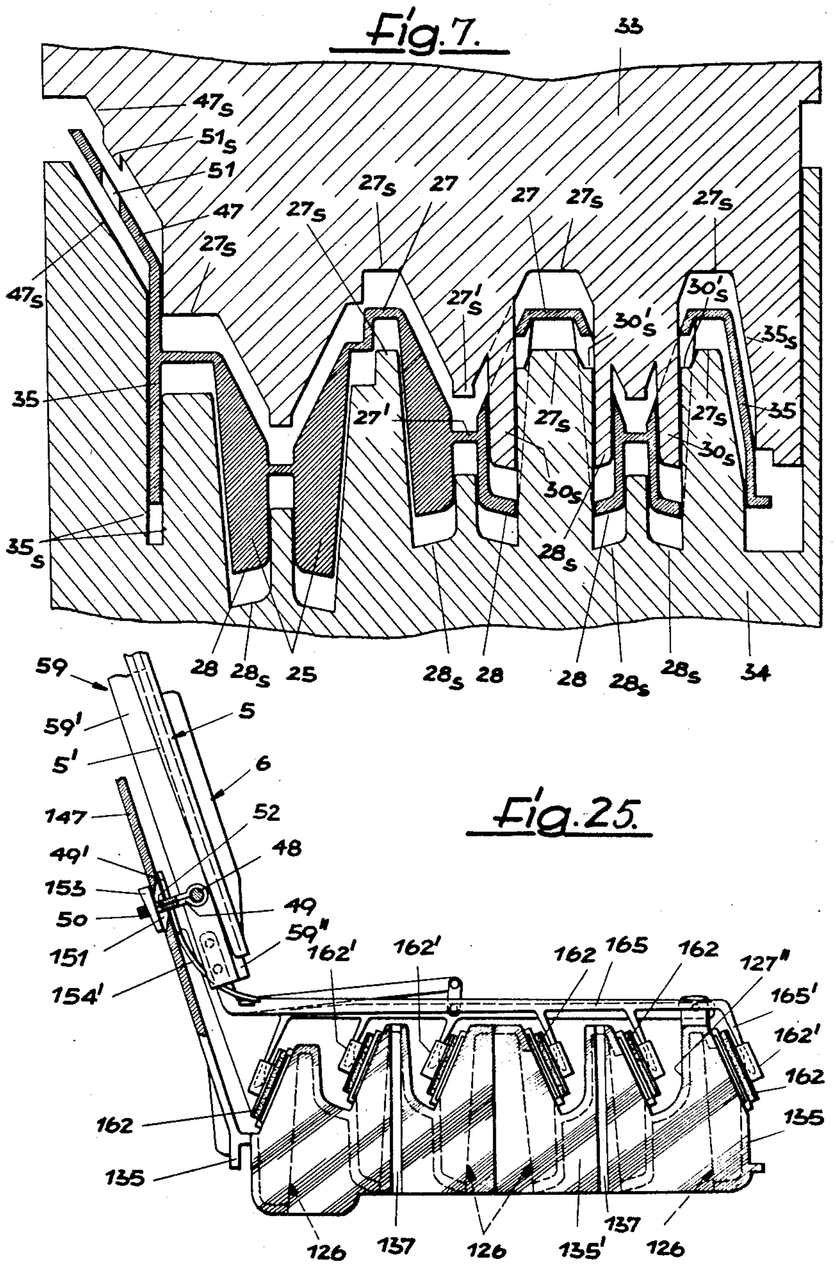
Figure 8:
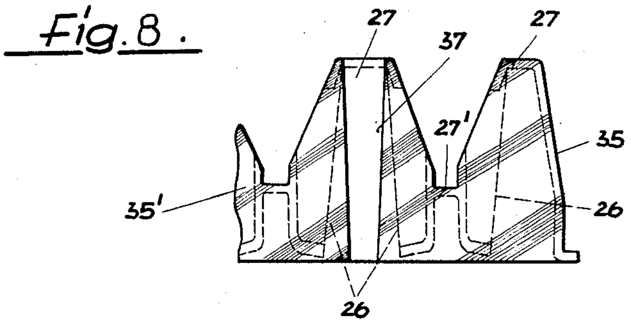
Figures 9, 10:
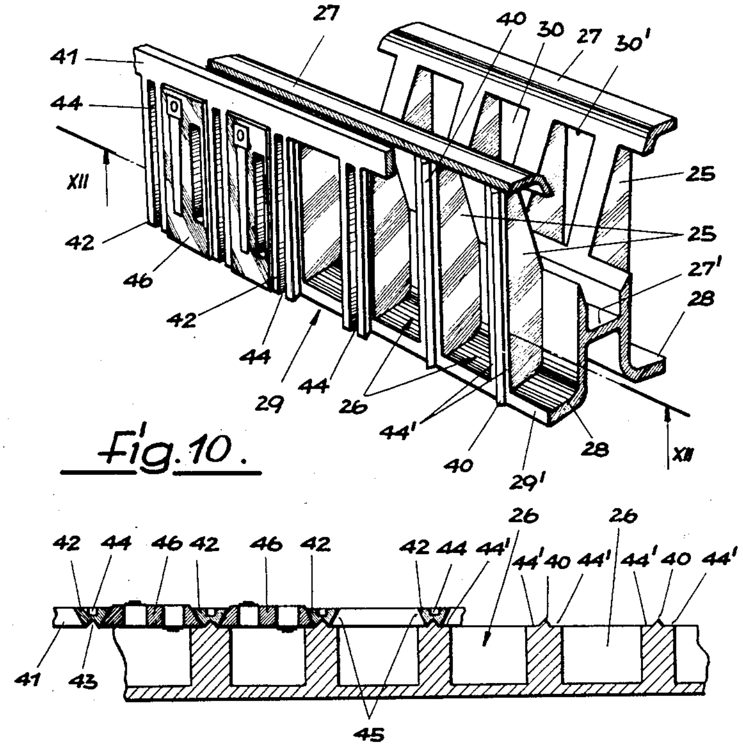
Figures 11, 12, 13, 14:
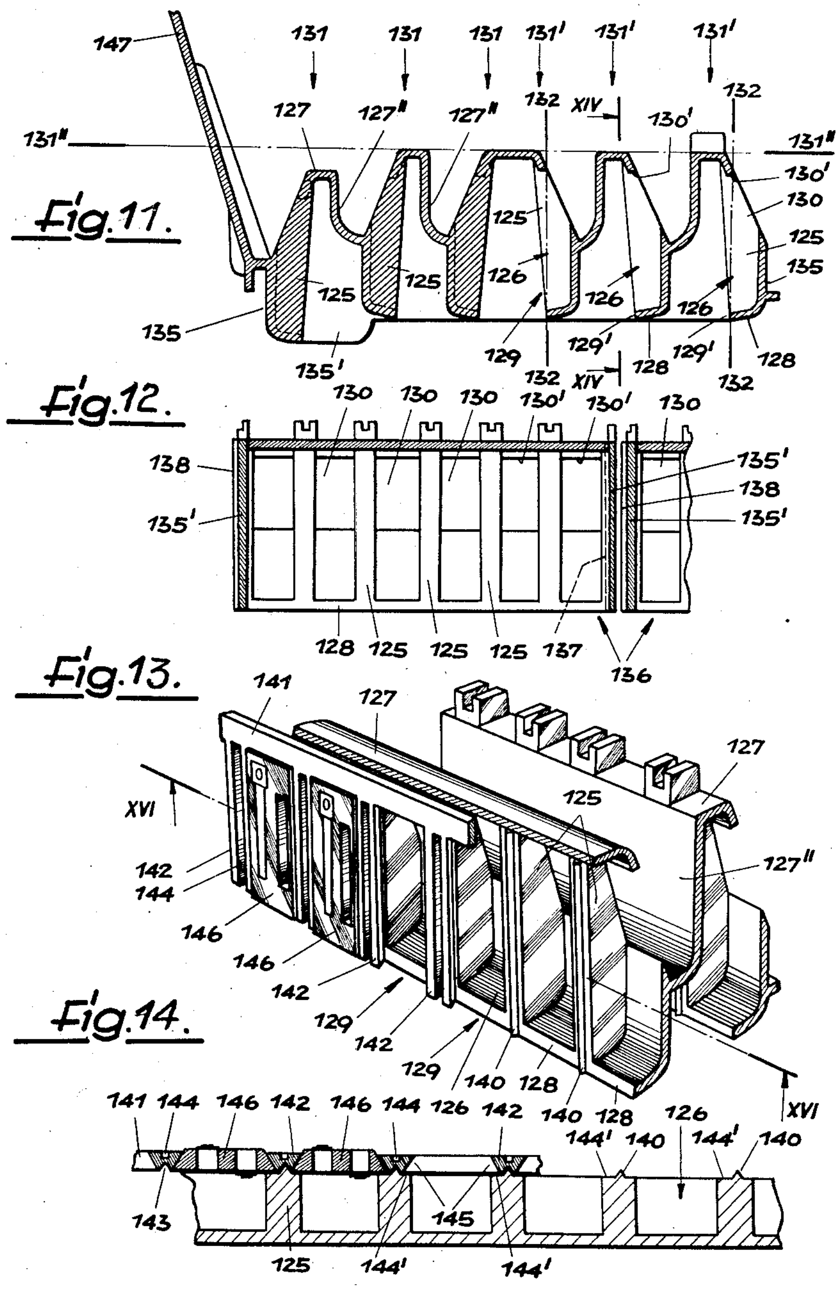
Figures 15, 16, 17:
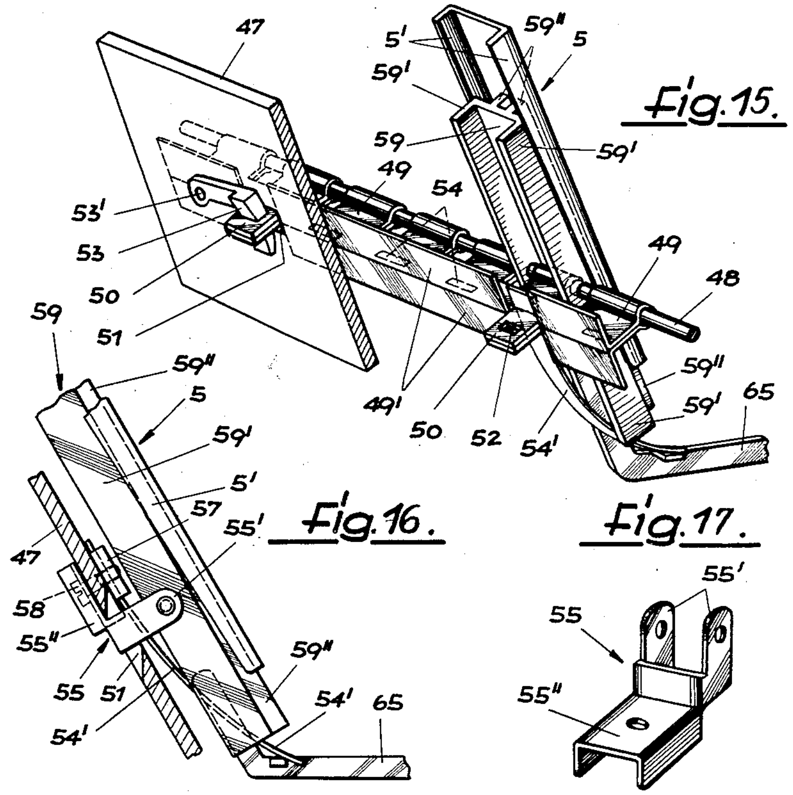
Figure 18:
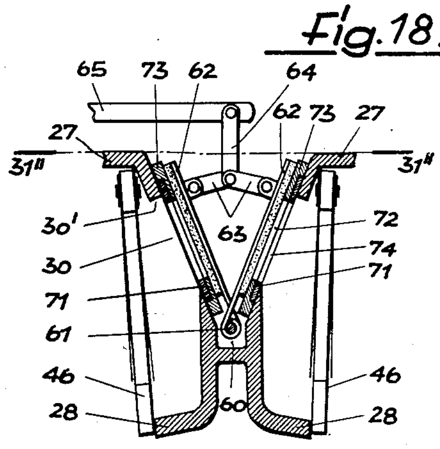
Figure 19:
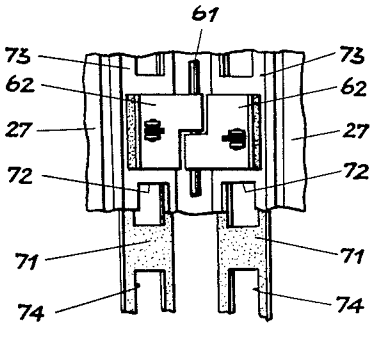
Figures 20, 21, 22, 23, 24:
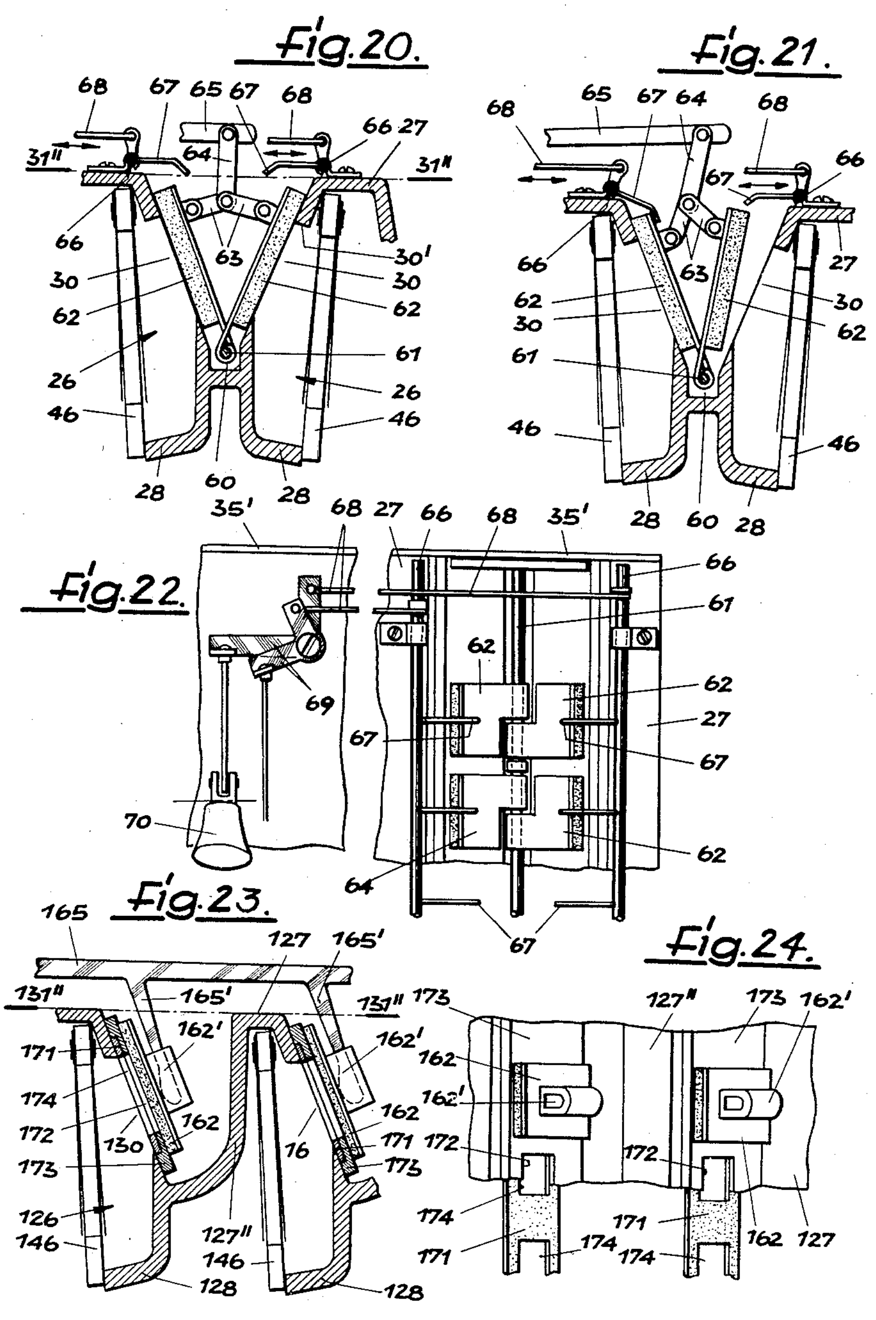

Further details of the invention will appear from the following description in conjunction with the accompanying drawings in which:

Figure 1 is a side elevation partly in section of an accordion according to the invention, Fig. 2 is a cross section of the cells, Fig. 3 is a plan view of the group of cellular units, Fig. 4 is a cross section through the cellular unit taken on line 4—4 of Fig. 3, Fig. 5 is a cross section through the cellular unit taken on line 5—5 of Fig. 3, Fig. 6 is a section taken on line 6—6 of Figs. 3 and 4, Fig. 7 is a cross section of the cellular unit of Fig. 4 together with the mold parts in which it is formed, Fig. 8 is a side elevation of a part of the cellular unit, Fig. 9 is a perspective view of a part of the cellular unit with certain parts broken away, Fig. 10 is a cross section of a cell group and the means to secure it to the sound plates taken on line 10—10 of Fig. 9, Fig. 11 is a cross section of a modified form of the cellular unit, Fig. 12 is a section of the unit of Fig. 11 taken on line 12—12, Fig. 13 is a perspective view of the unit of Fig. 11 with parts broken away, Fig. 14 is a section taken on line 14—14 of Fig. 13, Fig. 15 is a perspective view of the bearing means of the keys, Fig. 16 is a part sectional and part side elevational view of a second modified key mounting, Fig. 17 is a perspective view of a bearing element for the keys of Fig. 16, Fig. 18 is a cross section of an air valve, Fig. 19 is a plan view of the air valve of Fig. 18 with the operator omitted, Figs. 20 and 21 are cross sections of an air valve with special control mechanism in two different positions, Fig. 22 is a top plan view of the air valves of Figs. 20 and 21 with the operating levers omitted, Fig. 23 is a cross section of a part of the cellular unit of Fig. 11 with the air valve, Fig. 24 is a plan view of the valves of Fig. 23 with the operating lever omitted, and Fig. 25 is a side view partly in section of a cellular unit of the type of Fig. 11 with the air valves and lever operators.

The accordion of Fig. 1 comprises a known manner of a treble portion 1 and a bass portion 2 interconnected by means of a bellows 3. The treble portion 1 has a part 4 carrying the keyboard, on which are mounted the full tone keys 5 and the half tone keys 6. A cover 8 encloses the treble mechanism. Inside the space enclosed by the cover there is arranged a cellular member 9 connected to a wooden frame 10 to which also are attached the outer housing parts of the accordion. The frame 10 is sealed by means of a gasket 39.

The cellular member 9, according to the present invention is closed on the side wall 35 facing the plane of the bellows frame, and consists of cells 26, connected to each other by webs 27, which cells are open towards the bellows side, and having reed plates 46 connected thereto. The cells 26 have a common partition 25 between two adjoining cells 26 of a row of cells, and each cell has an opening 30 through a wall thereof. All parts of the cellular member are so arranged that they can make contact with two die members during manufacture movable one relatively to the other.

The two cells 19 and 20, Fig. 2, comprise the cellular unit having an intermediate wall 21' which is forked and the open sides 22' are not opposite the openings 23'. The upper wall 24' extends in a broken line. All parts of the cellular unit are so formed that upper surface can be contacted in two counter directions by two opposite movable forming tools parallel to the wall 21'.

Figs. 3 to 10 show another modification of the cellular unit.

Referring to Figs. 4 and 5 it will be seen that cells 25 and 26 separated by partitions 25 have walls which are integral with the web 27 and also walls 28 which face the bellows space below the unit. The cells are open at 29 and 29' towards the bellows and an opening 30 is provided in the cell wall 27. Such cells 26, as shown in Fig. 3, are arranged in parallel rows 31, 31' connected by webs 27'. Since, as appears from Fig. 3, the cell rows 31 can be offset relatively to other cell rows 31', different sections result according to Figs. 4 and 5.

In the modification according to Figs. 3 to 10 the cell top wall extends in profile as a broken line. In this case the surfaces of the openings 30 lie at an angle to a plane 31'', through the part of the unit most remote from the bellows frame, Figs. 4 and 5. All surfaces of the cellular unit are so formed that they can be contacted by two opposing shaping dies movable, in the case of a cellular unit having a broken line profile, parallel to planes defined as follows: The cells 26 have an opening 30 lying in the broken upper surface of the unit, which surface is at an angle to reference plane 31'' of the unit. The edges 30' of these openings 30 adjoining and parallel to the said plane of reference, and the cell edges 29' which carry the reed plates which edges extend parallel to the plane 31'', lie in parallel planes 32, Figs. 4 and 5. Shaping dies designated 33 and 34 in Fig. 7, move parallel to said planes in their molding operation. Obviously both dies need not be movable, as a movable die 33 may co-operate with a fixed die 34. Parts of the dies 33 and 34 are designated in Fig. 7 with reference numerals corresponding to those of the parts which they shape, but with the addition of the index S.

In an accordion having such cellular units each cell group is surrounded by walls 35 and 35' and the cellular unit is composed of groups 26 of rows of cells, Figs. 3, 6 and 8, which at the adjoining sides 35' are attached together and engage by means of grooves 37 and tongues 38. The edges of these grooves and tongues may converge towards the bellows, Fig. 8.

The modification according to Figs. 11 to 14 is in principle similar to that of Figs. 3 to 10. As best shown in Fig. 11, the cells 126 separated by partitions 125 have upper walls 127'' and lower walls 128 which extend below the material 127 towards the bellows. The cells 126 are provided at 129, towards the bellows, with openings 130, Fig. 12. These cells, like those of Fig. 3, are arranged in parallel rows 131 and 131' interconnected by web portions 127''. The cell rows 131 are mirror-image facsimiles of the cell rows 131'. All parts of the cellular unit are so formed that they can contact opposing surfaces of co-operating shaping dies movable in opposite directions and in a direction determined as follows: the edges 130' of the openings 130 adjoin the plane of reference 131' most remote from the bellows frame and extending parallel thereto, and the edges 129' of the cells opposite the plane of reference 131'' lie in parallel planes 132, the movement of the shaping dies being parallel to said planes.

Also in the modification of Figs. 11 and 12 each cell group is surrounded by walls 135 and 135' and the cellular unit is formed of groups 136 of rows of cells, Fig. 12, which engage each other at adjacent sides 135', by means of grooves 137 and tongues 138.

In the modification of Figs. 3 to 10 as well as in that of Figs. 11 to 13 special means as shown in Figs. 9, 10 and 13, 16 are provided for attaching the reed plates according to the cell formation. On the fronts of the partitions 25 and 125 carrying the reed plates, at the open sides 29 and 129 of the cells 26 and 126, there are provided, along the middle, knife-edged ribs 40 and 140 which are narrower than said front parts and are integral with the partitions 25 and 125. On the ribs 40 and 140 of one cell row there is fixed a flat comb 41 and 141, the teeth 42 and 142 of which each have a notch 43 and 143 to receive the knife-edged rib 40 and 140 of the associated partition 25 and 125 and on the opposite side a longitudinal groove 44 and 144 is provided. The comb 41 and 141 can be attached in any suitable manner, for example by a cement. The opposing bevelled sides of two adjacent teeth 42 and 142 form with the front parts 44' and 144' of two partitions 25 and 125, a dovetail groove 45 and 145 in which a reed plate 46 and 146 is inserted. The purpose of this construction is to provide a resilient mounting for the reed plates and its clamping action gives a firm seating for the reed plates 46 and 146 in the cellular unit and also suppresses transmission of vibrations from the reed plate in the cellular structure. It also permits easy insertion and removal of the reed plates.

In the modification of Figs. 3 to 10 and also that of Fig. 11 there is provided a plate 47 and 147 inclined to the reference plane 31'' and 131'' which plate is integral with the cellular unit and serves to carry the keyboard. This plate, like the cellular unit, is so formed that it can be contacted by the two co-operating dies during manufacture which shape the cellular unit, said dies, when they form said unit, also punching the openings 51 and 151 in the plate 47 and 147 for the mounting of the key pivots.

This unity of the plate 47 and 147 with the cellular structure provides a convenient mounting for the keys. In Figs. 15 and 25 which belong to the modifications of the cellular unit according to Figs. 3 to 10 and 11 to 14, the keyboard plate 47 and 147 carries a shaft 48 as a pivot for the keys 5 and 6, which shaft extends through hinge members 49 having arms which pass through openings 51 and 151 in the plate 47 and 147. These arms 50 are locked on the rear side of the plate 47 and 147, for example, by means of a bar 53 and 153 pivotable on a pin 53', and having a tapered portion projecting into the opening 52, whereby the hinge bearing 49, along with the other elongated hinge arm 49' is held against the plate 47 and 147. The holes 54 in the hinge arms 49 serve for the passage of plate springs 54' and 154' which restore any depressed keys 5 and 6 to initial position. The end of the spring near the hole 54 can be fixed to the plate 47 and 147 in any suitable manner, not shown.

The keys 5 and 6 are of U-shape in cross section and are connected to levers 59 pivoted on the shaft 48. The levers 59 have extensions which may be integral therewith. On the end of each lever, remote from the key is attached a lever 65 and 165 for moving the air flap 62 and 162. The body of the key 5 embraces the body 59' of the lever 59. When the cellular unit is composed of cell groups, the plate 47 consists of a number of parts corresponding to the number of cell groups and the hinge bearing 49 is also subdivided into a number of parts.

Also, as shown in Figs. 16 and 17, the keys 5 may be mounted singly on the keyboard plate 47 each by means of an elbow 55 one arm of which is attached to the key and extends through an opening 51 in the keyboard plate 47 from the side of the plate facing away from the keyboard, and the other arm 55" bearing on this side of the plate and is secured by a clamp plate 57 on the opposite side of the plate 47, which clamp plate is connected to the arm 55' by a screw 58.

The cellular unit, especially in the modification having its top surface, seen in profile, as a broken line, provides a very convenient arrangement of the air flaps covering the cell openings 30. As shown in Figs. 18 and 25, the rows of openings 30 in the broken upper surface 27 of the cellular unit which extend at an angle to the plane of reference 31" (Fig. 18) of said unit, are disposed in pairs in such a manner that the rows in profile converge towards the bellows 3. In the space 60 of these rows the air flaps 62 covering the openings 30, are arranged pairwise opposite each other and are pivoted on common axes 61.

In order to simulaneously close or open the row of openings lying in one plane in the cellular unit, there is provided a register slide 71, known per se, provided with openings 74, which slide is extended as a cover plate bridging the openings 30 and provided with openings 72 corresponding to the openings 74 and overlying the openings 30. The air flaps 62 rest on the cover plate 73 and cover the openings 72 thereof.

Figs. 20 and 21 show air flap operating means for the air flap arrangement of Figs. 18 and 19, for use in connection with a cellular unit having the surface with openings 30 inclined to the reference plane 31", which dispenses with the register slide 71 and cover plates 73 of Figs. 18 and 19. The arrangement is such that a shaft 66 is mounted on the unit parallel to each row of air flaps 62. This shaft 66 is provided with downwardly extending fingers 67, each of which in one position of rotation of the shaft 66 overlies a flap 62 and prevents it from opening, while in another position of rotation the flap is free to uncover the opening. The shafts 66 are each operated by a reciprocable rod mechanism 68, 69, movable by means of an operating knob 70, Figs. 1 and 22, near the keyboard, whereby one row of air flaps can be operated independently of the other rows of air flaps.

Figs. 23 and 24 show a portion of the cellular unit according to Figs. 11 to 14, in which the rows of openings 130 in a continuous portion 127" of the cellular structure are inclined to the plane of reference 131" of the cellular unit, and in which these openings are arranged in front of said continuous portion 127", and which widens the space in front of the opening 130 towards the plane of reference 131". This arrangement of the cellular structure provides a particularly advantageous tone radiation. The air flaps 162 in this instance are actuated by levers 165 connected to the keys, which levers have extensions 165' which work in a pocket 162' open at one side only and fixed to the air flap, which pocket contains a hardenable cement whereby the extension is fixed to the air flap 162. The position of the air flaps 162 inclined towards the reference plane 131", and their pockets 162' assist this securing of the lever extensions 165' to the air flaps 162.

To enable simultaneous covering and uncovering of a row of openings 130 in a flat part of the cellular unit, register slides 171 provided with openings 174, Fig. 24, and bridging cover plates provided with openings 173, are provided on the cellular unit, as in Figs. 18 and 19. The air flaps 162 rest on the cover plates 173 and cover their openings 172.

I claim as my invention:

1. An accordion comprising an integral cellular unit having reed plates mounted for operation by a bellows, said cellular unit having side walls to enclose the unit and extending towards the bellows, additional walls to form cells connected with each other and having openings directed towards the bellows, the reed plates being attached to the unit at said openings, the cellular unit having an upper surface extending in a broken line and the cells therein being so formed that each has a second opening in said upper surface, the plane of each opening lying at an angle to a plane of reference farthest removed from the bellows frame, and the edges of said openings adjacent the plane of reference extending parallel thereto, and cell edges opposite to said reference plane and extending parallel thereto, the edges carrying the reed plates being arranged in parallel planes, and a plate serving as a carrier for the keyboard extending at an angle from the reference plane of the cellular unit and being integral with the same, said plate having openings for attaching the keyboard.

2. An accordion comprising an integral cellular unit having reed plates mounted for operation by a bellows, said cellular unit having side walls to enclose the unit and extending towards the bellows, additional walls to form cells connected with each other and having openings directed towards the bellows, the reed plates being attached to the unit at said openings, the cellular unit having an upper surface extending in a broken line and the cells therein being so formed that each has a second opening in said upper surface, the plane of each opening lying at an angle to a plane of reference farthest removed from the bellows frame, and the edges of said openings adjacent the plane of reference extending parallel thereto, and cell edges opposite to said reference plane and extending parallel thereto, the edges carrying the reed plates being arranged in parallel planes, and a keyboard plate supporting an exis for the keys which axis pivots in a hinge bearing having arms extending through openings in the plate and held in place by fastening means on the back of said plate.

3. An accordion according to claim 1, in which a keyboard plate and key bearings are provided divided according to groups of cell rows.

4. An accordion according to claim 1, in which a keyboard plate and key bearings are provided divided according to groups of cell rows, each key being pivoted to the plate by means of an elbow, one arm of which carries the key and extends through an opening in the plate to the fastening means on the back thereof.

5. An accordion according to claim 1, in which a keyboard plate and key bearings are provided divided according to groups of cell rows, the keys being of U-shaped profile and are connected to levers of like profile.

6. An accordion according to claim 1, in which the rows of openings of the cells lie in the upper surface of the cellular unit at an angle to the plane of reference of said unit and are located opposite a continuous extended part of the cellular structure projecting into the space in front of the openings towards the reference plane, and air flaps for the openings having pockets open towards said reference plane, into which pockets the levers extend and are cemented.

7. An accordion according to claim 1, in which partitions are provided carrying the reed plates, and in which knife edge ribs are provided centrally located which are narrower than said fronts and are integral with the partitions, and a flat comb is fixed on the ribs of each cell row, the teeth of which, on the side facing said fronts, each has a notch for the ribs of the associated partition, and on the opposite side each tooth has an elongated groove, and the facing sides of two adjacent teeth, together with the fronts of the associated partitions form a dove-tail groove in which a reed plate is inserted.

References Cited in the file of this patent

UNITED STATES PATENTS

| | | |
|---|---|---|
| 2,069,447 | Iorio | Feb. 2, 1937 |
| 2,208,038 | Luttbeg | July 16, 1940 |
| 2,556,408 | Ahern et al. | June 12, 1951 |
| 2,588,881 | Rieschick | Mar. 11, 1952 |
| 2,603,120 | Rosenheim | July 15, 1952 |
| 2,635,500 | Baldanza | Apr. 21, 1953 |

FOREIGN PATENTS

| | | |
|---|---|---|
| 292,483 | Italy | Jan. 20, 1932 |
| 514,100 | Great Britain | Oct. 31, 1939 |